Feb. 13, 1951    D. F. ALEXANDER ET AL    2,541,904
ELECTRICAL SYSTEM ON RAILROAD CAR

Filed March 7, 1946    3 Sheets-Sheet 1

Donald F. Alexander INVENTORS
and Calvin J. Werner
BY Spencer, Hardman & Fehr
Their Attorneys.

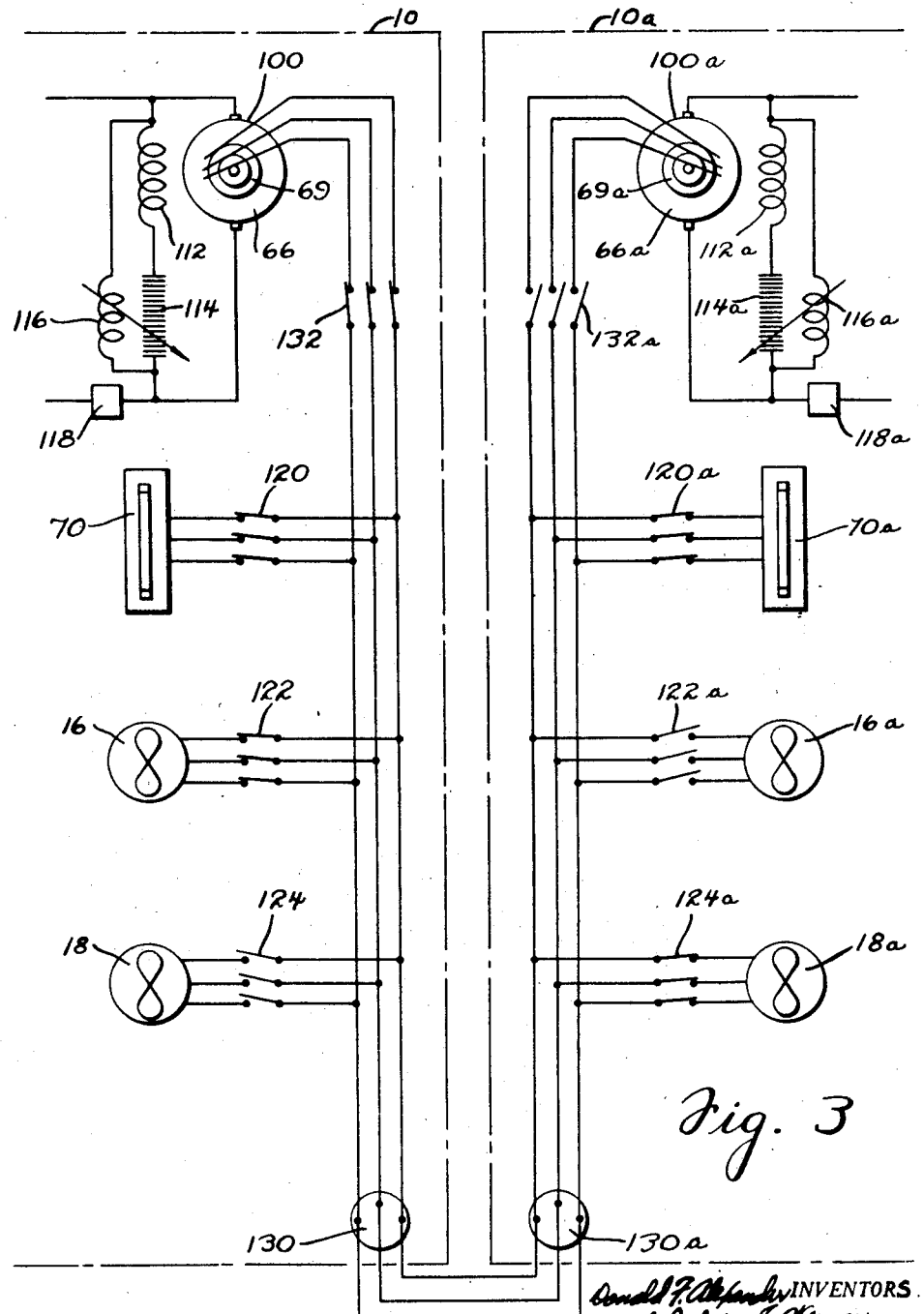

Patented Feb. 13, 1951

2,541,904

UNITED STATES PATENT OFFICE 2,541,904

ELECTRICAL SYSTEM ON RAILROAD CAR

Donald F. Alexander and Calvin J. Werner, Oakwood, Ohio, assignors to General Motors Corporation, Dayton, Ohio, a corporation of Delaware Application March 7, 1946, Serial No. 652,514

6 Claims. (Cl. 62—4)

1

This invention relates to refrigerating apparatus and more particularly to an improved air conditioning system.

It is an object of this invention to provide lightweight, inexpensive, and trouble-free air conditioning apparatus for use on railway cars and the like.

It is a further object of this invention to provide an air conditioning system in which the electrical energy for operating the compressor is derived from a main alternator and the electrical energy for operating the evaporator fan and the electric lights is derived from an alternating current take-off built into the direct current generator which excites the field of the main alternator.

It is a further object of this invention to provide a combined air conditioning and lighting system in which the air conditioning apparatus may be cycled without causing the lights to flicker.

Still another object of this invention is to provide an improved arrangement for energizing the lights and ventilator of one car from the power source on an adjacent car.

Another object of this invention is to use a dual voltage generating system so as to eliminate the need for a transformer between the lights and the power source for the lights.

Further objects and advantages of the present invention will be apparent from the following description, reference being had to the accompanying drawings, wherein a preferred form of the present invention is clearly shown.

In the drawings:

Fig. 3 illustrates the manner in which the generator on one car may be used for energizing the lights and ventilator of an adjacent car.

Figure 1:
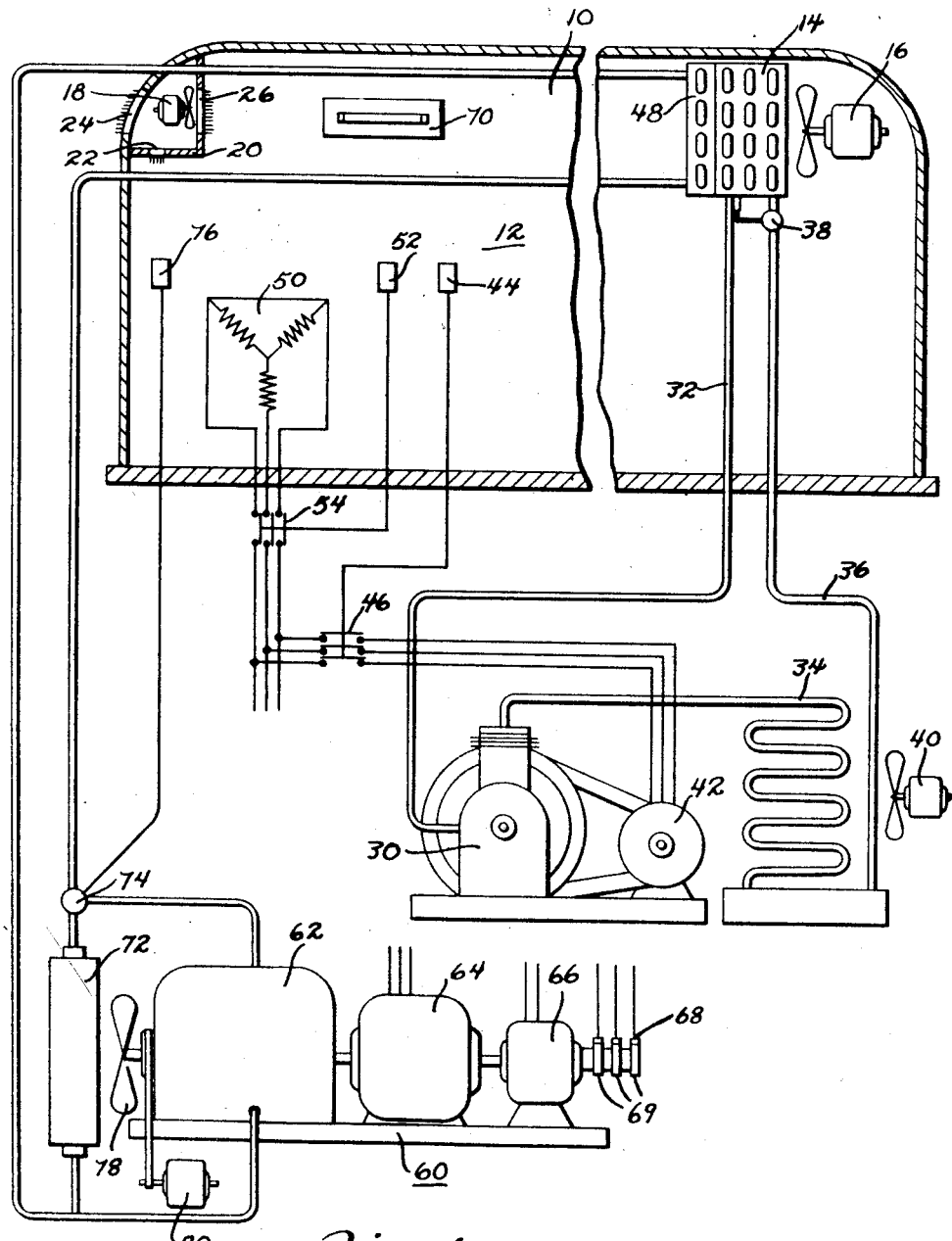
Fig. 1 is a diagrammatic view showing a preferred embodiment of the invention.

Referring now to Fig. 1 of the drawings, numeral 10 designates a conventional railway car having a passenger compartment 12. Air for the passenger compartment 12 is cooled by means of the refrigerant evaporator 14 located in the upper end zone of the passenger compartment 12. A fan unit 16 has been provided for circulating air from the compartment 12 in thermal exchange with the evaporator 14. The fan unit 16 is preferably operated at all times irrespective of the temperature conditions within the car so as to prevent stratification of the air within the passenger compartment. A ventilating fan unit 18 has been provided adjacent the opposite end of the car for independently circulating air within the passenger compartment. The fan unit 18 is preferably mounted in an enclosure 20 which is provided with a return air inlet 22 and a fresh air inlet 24 whereby either fresh air, recirculated air, or a mixture of both may be discharged through the outlet 26 into the conditioned space.

The evaporator 14 is connected to a refrigerant compressor 30 which withdraws refrigerant vapor from the evaporator 14 through the suction line 32 and discharges compressed refrigerant into the condenser 34 wherein the compressed vapor condenses prior to its return to the evaporator 14 through the liquid supply line 36.

For purposes of illustration, a conventional thermostatic expansion valve 38 has been shown for controlling the flow of liquid refrigerant from the condenser 34 to the evaporator 14, whereas it is obvious that any form of refrigerant control device may be substituted for the thermostatic expansion valve 38 without departing from the spirit of our invention. A fan unit 40 has been provided for circulating condenser cooling air in thermal exchange with the condenser 34. A three phase, 220 volt, alternating current motor 42 has been provided for operating the compressor 30 whenever refrigeration is called for within the passenger compartment 12. The compressor motor 42 is controlled by a thermostat 44 which opens and closes a switch 46 located in the motor circuit.

Heat may be supplied to the conditioned space 12 by the heating coil 48 located adjacent the outlet of the evaporator 14. The heating coil 48 may be used for reheating the air during the cooling season and to supply overhead heat during the heating season. Floor heat may be supplied by the electric heating elements 50 which are used for supplying the major heating requirements during the winter season. The heating elements 50 are controlled by a thermostat 52 located in the conditioned space 12. The thermostat 52 operates a switch 54 which is located in the power lines leading to the heating elements 50.

A self-contained power unit generally designated by the reference numeral 60 is provided for each individual railway car. The power unit preferably comprises a Diesel engine 62 which is directly connected to a three phase, 60 cycle, 220 volt alternator 64. The alternator 64 generates electrical energy for the condenser fan unit 40, the compressor motor 42, the electric heating elements 50, and any other heavy duty equipment which may be required on the car.

The engine 62 also drives a direct current generator or exciter 66 which has incorporated therein a 110 volt alternating current take-off 68 which provides a separate source of alternating current for energizing the fluorescent lights 70, the evaporator blower 16 and the ventilating unit 18.

The Diesel engine 62 is provided with a conventional radiator 72 for dissipating the heat generated by the engine. The radiator 72 is connected in parallel fluid flow relationship with the heating coil 48. The flow of heat transfer liquid in the engine cooling system is controlled by means of a three way valve 74 which in turn is controlled by means of a thermostat 76 located within the conditioned space. The valve 74 serves to direct all of the hot liquid leaving the cooling jacket of the engine 62 through the coil 48 when maximum heating is called for by the thermostat 76 and to direct all of the hot liquid through the radiator 72 when no heating whatever is called for by the thermostat 76. The engine 62 is provided with a direct connected fan 78 which serves to circulate air in thermal exchange with the radiator 72 in accordance with conventional practice. A starting motor 80 has been provided fror cranking the Diesel engine. The starting motor 80 is energized from a storage battery 82 connected in series circuit relationship with the starter switch 84 as shown.

The thermostats 44, 52 and 76 are preferably dry bulb thermostats arranged within the conditioned space. It is obvious that these thermostats could be replaced by other types of controls responding to either dry bulb temperature, wet bulb temperature, or a combination of both. It is also obvious that the controls could further be modified so as to respond to changes in the outside air temperature as well as the inside air temperature.

Figure 2:
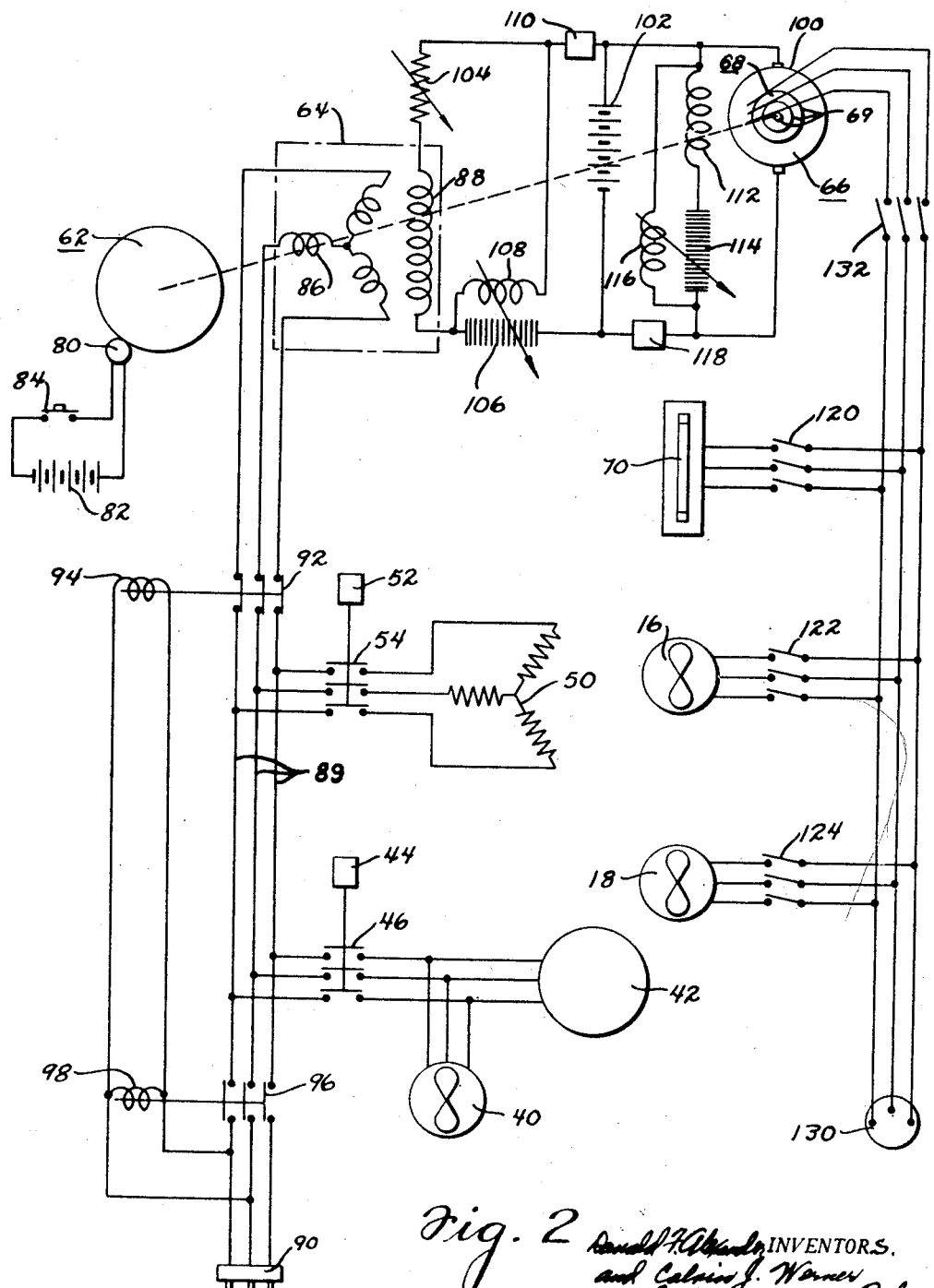
Fig. 2 shows a simplified diagram of the electrical circuits.

As shown in Fig. 2 of the drawing, the alternator or generator 64 comprises an armature 86 and a field coil 88. The armature 86 supplies three phase power to the main power lines 89 whenever the Diesel engine 62 operates and the switch 92 is closed. The heating elements 50 are connected to the power lines 89 through the switch 54 which is adapted to be controlled by the thermostat 52. The compressor motor 42 and the condenser fan motor 40 are likewise connected to the power lines 89 through the thermostatically controlled switch 46. The power lines 89 may be connected to an outside source of power by means of the plug 90 when it is desired to stop the engine 62 and to use an outside source of power for maintaining operation of the air conditioning apparatus. In order to prevent operation of the alternator 64 as a motor when standby power is available, we have provided a switch 92 for disconnecting the armature 86 when power is supplied to the circuits through the connector plug 90. The switch 92 is controlled by means of the solenoid 94 which is automatically energized so as to open a switch 92 whenever power is supplied from the outside source. A separate switch 96 is provided as shown and is adapted to be closed whenever the solenoid 98 is energized. By virtue of this arrangement, the connector 90 is completely dead when no outside source of current is supplied to the system.

The alternator field coil 88 is normally supplied with current from the armature 100 of the generator 66 and when the generator 66 is not able to supply the necessary current, the battery 102 will supply current for energizing the field 88. The arrangement is such that the generator 66 keeps the battery 102 charged and supplies energy to the field coil 88 when operating under normal conditions. A variable resistance element 104 is provided in series with the field coil 88 of the alternator in accordance with usual practice. A carbon pile rheostat 106 is also provided in the circuit for automatically controlling the flow of current to the field 88. The carbon pile rheostat 106 is controlled by the coil 108 arranged in the circuit as shown. Reference numeral 110 designates a conventional switch mechanism which prevents flow of current to the field coil 88 when the alternator 64 is standing still or is not operating at normal generating speeds. The control 110 may be a manually operated switch or it may be an automatic control such as a speed responsive switch which closes only after the alternator attains a predetermined speed.

The direct current generator 66 is provided with a field coil 112. The flow of current through the field coil 112 is controlled by the carbon pile rheostat 114 which in turn is controlled by the solenoid 116 arranged in the circuit as shown. Reference numeral 118 designates a conventional reverse current relay which prevents the generator 66 from being operated as a motor energized from the battery 102 when the speed of the Diesel engine falls below the normal generating speed. As explained hereinabove the direct current generator 66 is provided with an alternating current take-off 68 comprising slip rings 69 which supply the necessary amount of alternating current for operating the fluorescent lights 70, the evaporator blower 16, the ventilator 18, and any other low voltage equipment which would not cause any light flicker.

Switches 120, 122 and 124 are provided for controlling the flow of current to the lights 70, the evaporator blower 16 and the ventilator 18 respectively. These switches are preferably manually controlled, although automatic controls may be used if desired. Reference numeral 130 designates a car jumper connection which makes it possible to connect the lights and blower motor circuit of one car to the corresponding circuit of a second or adjacent car 10a as shown in Fig. 3. Each car is provided with a complete air conditioning and lighting system corresponding to that shown in Fig. 2. Like reference numerals have been applied to like elements on the cars except that the suffix "a" has been added to the reference numerals which designate the equipment on the second or adjacent car.

By virtue of this arrangement, it is possible in an emergency to shut down the Diesel engine of one car and to energize the lights and blower motors in that car from power supplied from an adjacent car. A switch such as switch 132 has been provided in the circuit leading to the lights and blower motors of each car for disconnecting the lights and blower motors from the immediate power source when it is desired to energize these elements from the power source on an adjacent car. It is obvious that by using the circuit arrangement shown in Fig. 2, turning on and off of the heaters 50 on the compressor motors 42 will have no effect on the voltage supplied to the lighting circuits. It is also obvious that the need for complicated voltage controls has been eliminated since the heavy duty equipment which is not critical of minor voltage fluctuations is all energized from the one circuit and the lights which are sensitive to minor voltage changes have been connected in a special circuit in which there is no heavy duty equipment. The evaporator blower motor 16 and the ventilating motor 18 are rarely, if ever, turned on and off during normal occupation of the passenger compartment and for that reason these motors will not cause any voltage disturbances in the lighting circuit. The alternating current voltage take-off which has been incorporated into the generator 66 may be of any conventional design and may be designed so as to supply either 110 volt, 220 volt, or any other voltage desired. Since most lights require a 110 volt source of supply, it is preferable to design the alternating current take-off mechanism for 110 volts so as to eliminate the need for transformers and high voltage car jumper connections.

No attempt has been made in Fig. 3 of the drawing to show all of the electric equipment on the two adjacent cars as all of the electrical equipment on each car would be a duplicate of that shown in Fig. 2.

While the form of embodiment of the invention as herein described constitutes a preferred form, it is to be understood that other forms might be adopted, all coming within the scope of the claims which follow.

What is claimed is as follows:

1. An electrical and lighting system for an enclosure comprising in combination, a power source, an alternating current generator driven by said power source, a second generator driven by said power source, said second generator having incorporated therein mechanism for generating and delivering alternating and direct current, electrically energized means for said enclosure, means for supplying electrical energy to said electrically energized means from said alternating current generator, electric lighting means for said enclosure, and means for supplying said electric lighting means with alternating current delivered by said mechanism, said alternating current generator comprising field coil means, and means for supplying energy from said second generator to said field coil means.

2. An electrical and lighting system for an enclosure comprising in combination, a power source, an alternating current generator driven by said power source, a second generator driven by said power source, said second generator having incorporated therein mechanism for generating and delivering alternating and direct current, an alternating current device, means for supplying electrical energy to said alternating current device from said alternating current generator, a second electric alternating current device for said enclosure requiring alternating current of more constant characteristics for satisfactory operation than the first device, and means for energizing said second device from said second generator whereby changes in load on said first named alternating current generator have a substantial effect only on its own output circuit, said alternating current generator comprising field coil means, and means for supplying energy from said second generator to said field coil means.

3. An electrical and lighting system for an enclosure comprising in combination, a constant speed engine, an alternating current generator having a relatively high voltage output driven by said engine, said alternating current generator having field coil means, a second generator driven by said engine connected to said field coil means so as to supply electrical energy thereto, electrical means for said enclosure operated by means of electrical energy supplied by said alternating current generator, electric lighting means for said enclosure, said second generator having incorporated therein mechanism for generating and delivering relatively low voltage alternating current, and means for energizing said electric lighting means from said mechanism.

4. An electrical and alternating current fluorescent lighting system for an enclosure comprising in combination; a prime mover; an alternating current generator driven by said prime mover; said alternating current generator comprising an armature circuit and a field circuit; a unitary-dynamo-electric machine driven by said prime mover, said dynamo-electric machine having a field circuit and two separate armature circuits, one of which delivers direct current and the other of which delivers alternating current; electrically energized means for said enclosure; means for supplying electrical energy to said electrically energized means from the armature circuit of said alternating current generator; means responsive to requirements of said enclosure for varying the amount of electrical energy supplied to said electrically energized means; electric alternating current fluorescent lighting means for said enclosure; means for supplying electrical energy from the alternating current armature circuit of said dynamo-electric machine to said electric lighting means, and means for supplying electrical energy from the direct current armature of said dynamo electric machine to said field circuit of said alternating current generator.

5. An electrical and lighting system for an enclosure comprising in combination, a prime mover, an alternating current generator driven by said prime mover, said alternating current generator comprising an armature circuit and a field circuit, a unitary dynamo-electric machine driven by said power source and having a field circuit and two separate armature circuits one of which delivers direct current and the other of which delivers alternating current, electrically energized means for said enclosure, means for supplying electrical energy to said electrically energized means from the armature circuit of said alternating current generator, means responsive to requirements of said enclosure for varying the amount of electrical energy supplied to said electrically energized means, electric lighting means for said enclosure, means for supplying electrical energy from the alternating current armature circuit of said dynamo-electric machine to said electric lighting means, and means for supplying electrical energy from the direct current armature of said dynamo-electric machine to the field circuit of said alternating current generator, a battery, circuit connections between said battery and the field coil of said alternating current generator, and circuit connections between the said battery and direct current armature circuit of said dynamo-electric machine.

6. Means for supplying electrical energy and lighting a plurality of connected railway cars comprising in combination, a first alternating current generator supported on a first of said cars, first electrical means mounted on said first car, means for supplying electrical energy from said first alternating current generator to said first electrical means, a first prime mover, means for connecting said first alternating current generator to said first prime mover, a separate generating means adapted to be mounted on said first car and having one armature circuit for supplying alternating current energy and another armature circuit for supplying direct current energy, said first named alternating current generator having a field circuit, means for energizing said field circuit from said direct current armature circuit, electric lighting means in said first car, a first lighting circuit including said electric lighting for said first car, means for connecting said lighting circuit to the alternating current armature of said first separate generating means, a second prime mover mounted on a second car, a second alternating current generator including a field circuit driven by said second prime mover, a second electrical means mounted on said second car, means for supplying electrical energy from said second alternating current generator to said second electrical means, a second separate generating means mounted on said second car, means for transmitting power from said second prime mover to said second separate generating means, said second separate generating means having incorporated therein a direct current armature circuit for supplying electrical energy to the field circuit of said second alternating current generator and having an alternating current armature circuit for delivering alternating current, a second lighting circuit including lighting means for said second car, means for connecting said second lighting circuit to the alternating current armature of said second separate generating means, connector means for connecting said first named lighting circuit to said second named lighting circuit, and electrically operated means responsive to the connection of said connector means for disconnecting said first named lighting circuit from the alternating current armature of said first dynamo electric machine.

DONALD F. ALEXANDER.
CALVIN J. WERNER.

REFERENCES CITED

The following references are of record in the file of this patent:

UNITED STATES PATENTS

| Number | Name | Date |
|---|---|---|
| 1,375,393 | Johnstone | Apr. 19, 1921 |
| 1,633,166 | Davis | June 21, 1927 |
| 1,921,719 | Allen | Aug. 8, 1933 |
| 1,957,016 | Loudon | May 1, 1934 |
| 2,218,793 | Horton et al. | Oct. 22, 1940 |
| 2,339,903 | Alexander | Jan. 25, 1944 |

FOREIGN PATENTS

| Number | Country | Date |
|---|---|---|
| 129,992 | Switzerland | Feb. 1, 1929 |